United States Patent [19]

Kriegisch et al.

[11] Patent Number: 4,991,057
[45] Date of Patent: Feb. 5, 1991

[54] HOUSING FOR RECEIVING ELECTRIC ASSEMBLIES

[75] Inventors: Peter Kriegisch, Leonberg; Wolfgang Pickel, Stuttgart, both of Fed. Rep. of Germany

[73] Assignee: Alcatel N.V., Amsterdam, Netherlands

[21] Appl. No.: 535,288

[22] Filed: Jun. 8, 1990

Related U.S. Application Data

[63] Continuation of Ser. No. 272,492, Nov. 16, 1988, abandoned.

[30] Foreign Application Priority Data

Nov. 17, 1987 [DE] Fed. Rep. of Germany ....... 3738896

[51] Int. Cl.⁵ ................................................ H05K 7/16
[52] U.S. Cl. ..................... 361/391; 361/394; 361/428
[58] Field of Search ................ 174/48, 50; 361/331, 361/356, 380, 391–396, 399, 428, 429

[56] References Cited

U.S. PATENT DOCUMENTS 4,739,445  4/1988  Tragen ............................ 361/391

FOREIGN PATENT DOCUMENTS 0154570  9/1985  European Pat. Off. .
1063679  8/1959  Fed. Rep. of Germany .
1296232  5/1969  Fed. Rep. of Germany .
1766273  8/1970  Fed. Rep. of Germany .
2119350 11/1971  Fed. Rep. of Germany .
2846825  5/1980  Fed. Rep. of Germany .
2932364  2/1981  Fed. Rep. of Germany .
3026247  2/1982  Fed. Rep. of Germany .
8620196  1/1987  Fed. Rep. of Germany .

OTHER PUBLICATIONS

"Realisierung Vielseitig Nutzbarer Ubertragungsnetze for Text und Daten" Gerhard Merz und Gerhard Pumpe, telecom report 10 (1987) Special-Mulitplex--und Leitungseinrichtungen, pp. 197–206.

Primary Examiner—Gregory D. Thompson
Attorney, Agent, or Firm—Christie, Parker & Hale

[57] ABSTRACT

A housing (1) serves to receive, for example, primary-access and basic-access plug-in units (2) used as network terminations in ISDN. To be able to connect private branch exchanges of different sizes, it must be possible to add further plug-in units. A housing which can be readily extended and is accessible from all sides contains a chassis module (16, 18, 19) which is attached to a base plate (3). Fasteners (28) can be lengthened with auxiliary fasteners (28) so that additional chassis modules (31) can be added. In the closed condition, all sidewalls (9, 10) of the housing are locked by a lockable cover plate (12).

8 Claims, 4 Drawing Sheets

HOUSING FOR RECEIVING ELECTRIC ASSEMBLIES

CROSS-REFERENCE TO RELATED APPLICATIONS

This is a continuation of application Ser. No. 07/272,492 now abandoned, filed Nov. 16, 1988.

TECHNICAL FIELD The present invention pertains to a housing for electric assemblies, particularly communications network terminations;

CLAIM FOR PRIORITY

This application is based on and claims priority from an application first filed in Fed. Rep. Germany on Nov. 17, 1987 under Ser. No. P37 38 896.7. To the extent such prior application may contain any additional information that might be of any assistance in the use and understanding of the invention claimed herein, it is hereby incorporated by reference.

BACKGROUND ART

Such a communications network termination housing conventionally has sidewalls covering the electric assemblies but leaving the front end of the chassis modules uncovered.

It is desirable to add further plug-in units to such housings so that they can form, e.g., the termination of a communications network to which private branch exchanges of different sizes are connected. Prior-art housings which can be equipped with a different number of plug-in units are described in the special issue of 'Telecom Report 10', "Multiplex- und Leitungseinrichtungen" (1987), page 204. The dimensions of the housing itself, however, are invariable, so that it may be too large in some cases and too small in others. Housings for electric assemblies are also known which are designed as an add-on system to which further chassis modules can be added, if required. See for instance published German Utility Model (DE-GM 76 13 268.8). However, such housings are hard to protect against access by unauthorized persons. In addition, each individual housing has to be removed to allow access to the assemblies contained therein.

DISCLOSURE OF INVENTION

It is the object of the invention to provide a housing which is readily extensible and which can be closed in a simple manner.

The housing in accordance with the invention is characterized in
that it contains a chassis module which is attached to a base plate by holding means,
that the holding means can be lengthened so that an additional chassis module can be added,
that, when the housing is closed, all other sidewalls are locked by means of a cover plate which forms one of the sidewalls of the housing.

The advantages of various aspects of the invention are, inter alia, that after the cover plate has been removed, only two parts, i.e., the sheet-metal cover and the plastic cover plate, have to be taken off to gain easy access to the plug-in units even from the rear. On the other hand, an operator, without being authorized to have access to the assemblies, can observe the displays on the front side of the plug-in unit and thus detect faults without difficulty. Only two elements of different size are needed for housings of different size, so that stockkeeping is simplified considerably.

BRIEF DESCRIPTION OF DRAWINGS

Embodiments of the invention will now be explained with reference to the drawings, in which.

BEST MODE FOR CARRYING OUT THE INVENTION

Figure 1:
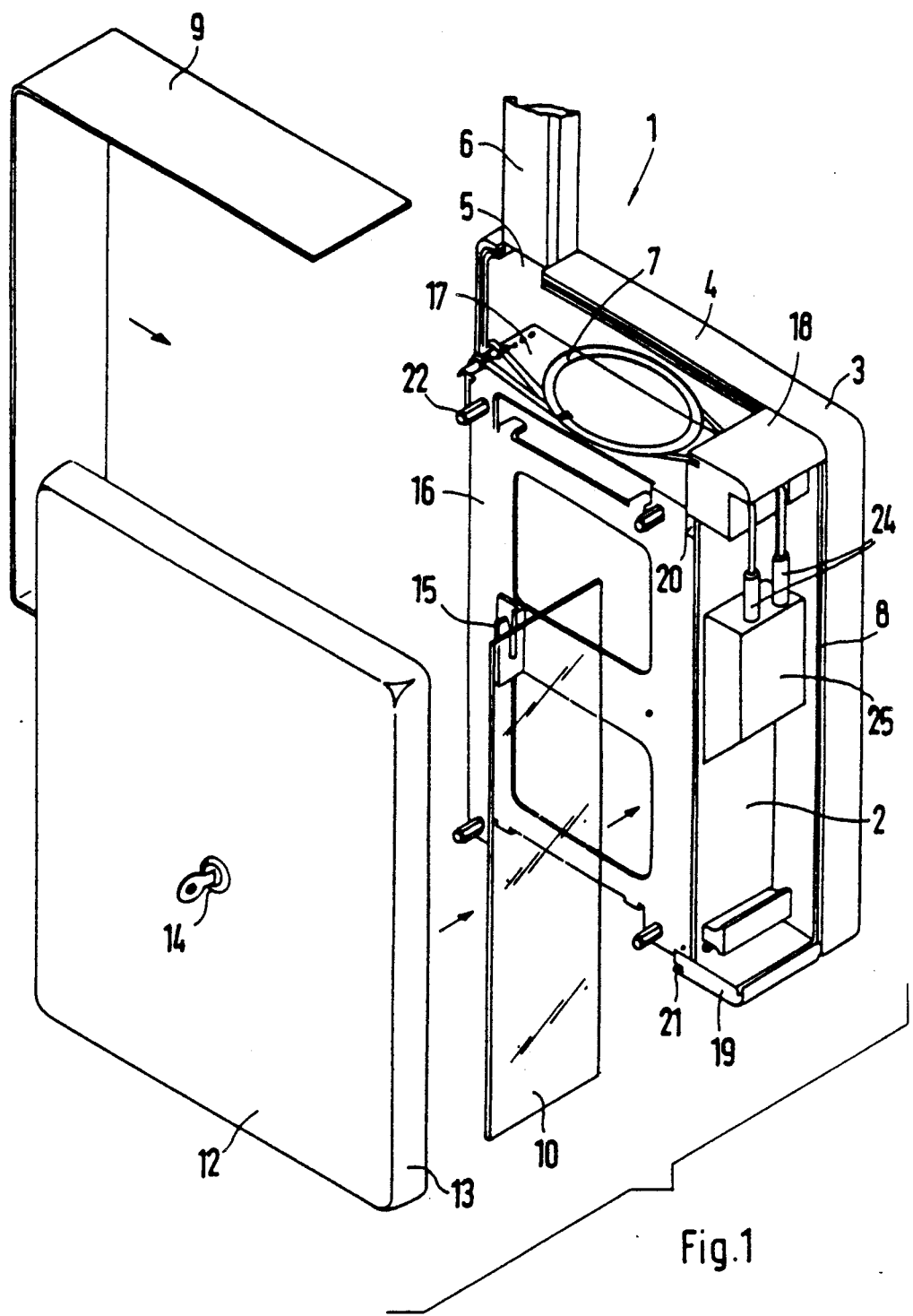
FIG. 1 is an exploded perspective view of a housing in accordance with the invention.

A housing 1 in accordance with the invention shown in FIG. 1 is designed to receive only one plug-in unit 2. This plug-in unit 2 constitutes a complete functional unit for use in communications systems, e.g., a basic-access or a primary-access network termination for an ISDN. The plug-in unit 2 comprises one or more circuit board(s) which contain(s) the assemblies of these terminations (not shown in detail, since they are not necessary to explain the invention).

Apart from the outer housing in a narrower sense, the housing 1 also includes a number of additional devices which serve to receive and make electric and optical connections to the functional units. Therefore, the term "housing" is used here in a wider sense, to mean, e.g., a module frame or a device for receiving network terminations or similar circuit modules.

A base plate 3 is provided for wall mounting. In its circumferential edge portion 4, it has an opening 5 to which a cable duct 6 is connected in which, in the mounted condition, the leads to be connected to the plug-in unit 2 (see FIG. 4) and fiber-optic cables 7 are guided.

In this drawing, the base plate 3 forms the right sidewall of the housing 1. Its edge portion 4 has a groove 8. Inserted into this groove 8 is the lateral edge portion of a U-shaped sheet-metal cover 9, which forms the upper, rear and lower sidewalls of the housing 1. The front sidewall of the housing 1 is formed by a plexiglass plate 10 whose edge portion is also inserted into the groove 8. A cover plate 12 forms the left sidewall of the housing 1 and serves also to lock the latter.

At its edge portion 13, the cover plate 12 also has a continuous groove which, when the housing 1 is assembled, is slipped on the left-hand edge portions of the sheet-metal cover 9 and the plexiglass plate 10. The movements required to assemble the housing with the parts 9, 10 and 12 are indicated by arrows.

The cover plate 12 forms the end of the housing 1 and has a lock 14 provided with a movable locking bolt (not shown in this drawing), which can be turned into a locking plate 15. In this manner, the housing can be locked, so that operators not authorized to carry out maintenance and repair services do not have access to the circuit modules inside the housing. On the other hand, any check and fault indicators which may be present on the front side of the plug-in unit 2 are always visible through the plate 10. The locking plate 15 is fixed to a mounting plate 16 which forms the boundary of the available space for the plug-in unit 2. In the upward direction, this space is limited by a bent leg 17 of the mounting plate. Between the base plate 3 and the mounting plate 16, an upper spacer 18 and a lower spacer 19 are inserted, their position in relation to each other being determined by pins 20 and 21.

The mounting plate 16 is connected with the base plate 3 by four holding means which can be lengthened and of which only the respective locking bolts 22 are shown in FIG. 1. These holding means will now be explained with reference to FIG. 2.

The upper spacer 18 has two openings or holes through which the fiber-optic cables 7 are passed so as to ensure that their bending radius reaches the prescribed minimum value. Via connectors 24, the fiber-optic cables 7 are connected to an optical connecting device 25 which contains, for example, optical-to-electric transducers.

The embodiment shown in FIG. 1 represents the basic equipment of the housing in accordance with the invention. That housing is designed to receive only one plug-in unit 2. The housing can be extended in a very simple manner as an add-on system. To that end, it is necessary only to attach the required number of additional spacers 18 and 19 and the corresponding mounting plates 16 to the respective preceding mounting plate 16.

Figure 2:
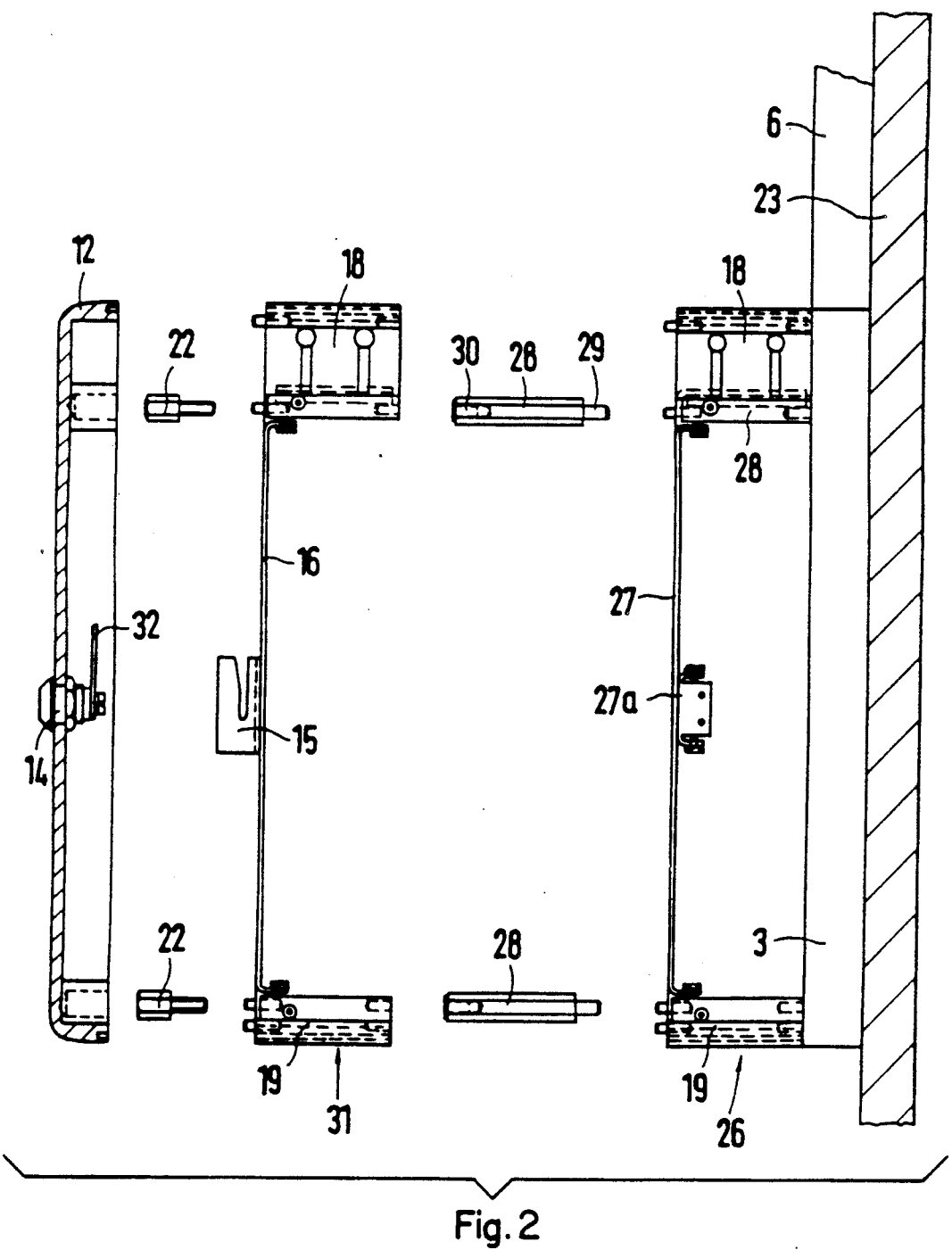
FIG. 2 is an exploded side view of parts of the housing of FIG. 1.

FIG. 2, which represents the assembly of a housing for two plug-in units in accordance with the invention, clearly shows the modular structure of the housing. The base plate 3 is mounted on a wall 23.

A first chassis module 26, which is fixed to the base plate 3, essentially comprises a mounting plate 27, the upper spacer 18, and the lower spacer 19. The mounting plate 27 is substantially similar to the mounting plate 16 but has no locking plate. To be able to insert even plug-in units having only half the standard height—i.e., units of three unit heights instead of six—an intermediate rail 27a is screwed to the mounting plate 27.

The first chassis module 26 is fixed to the base plate 3 by four holding means 28. The holding means 28 are hexagon posts which have an external thread 29 at one end and a corresponding internal thread 30 at the other end. Thus, an additional holding means 28 can be screwed to each holding means 28. The external threads 29 of the first four holding means 28 are screwed into corresponding holes in the base plate 3. The first chassis module 26 is then slipped over the holding means 28. Four additional holding means 28 are screwed into the first holding means 28, and a second chassis module 31 is then slipped on. This chassis module 31 is then fastened by screwing on four locking bolts 22.

After the sheet-metal cover 9 and the plexiglass plate 10 (see FIG. 1) have been inserted, only the cover plate 12 has to be slipped on to complete the housing. By means of the lock 14, a dead bolt 32 can be turned into the locking plate 15 and the housing thus be locked.

For the different numbers of plug-in units with which the housing 1 can be equipped, the same parts are always required. Only the sizes of the sheet-metal cover 9 and the plexiglass plate 10 vary, since they must have the respective required width. Stockkeeping of the parts for the housings in accordance with the invention is therefore simplified considerably.

Figure 3:
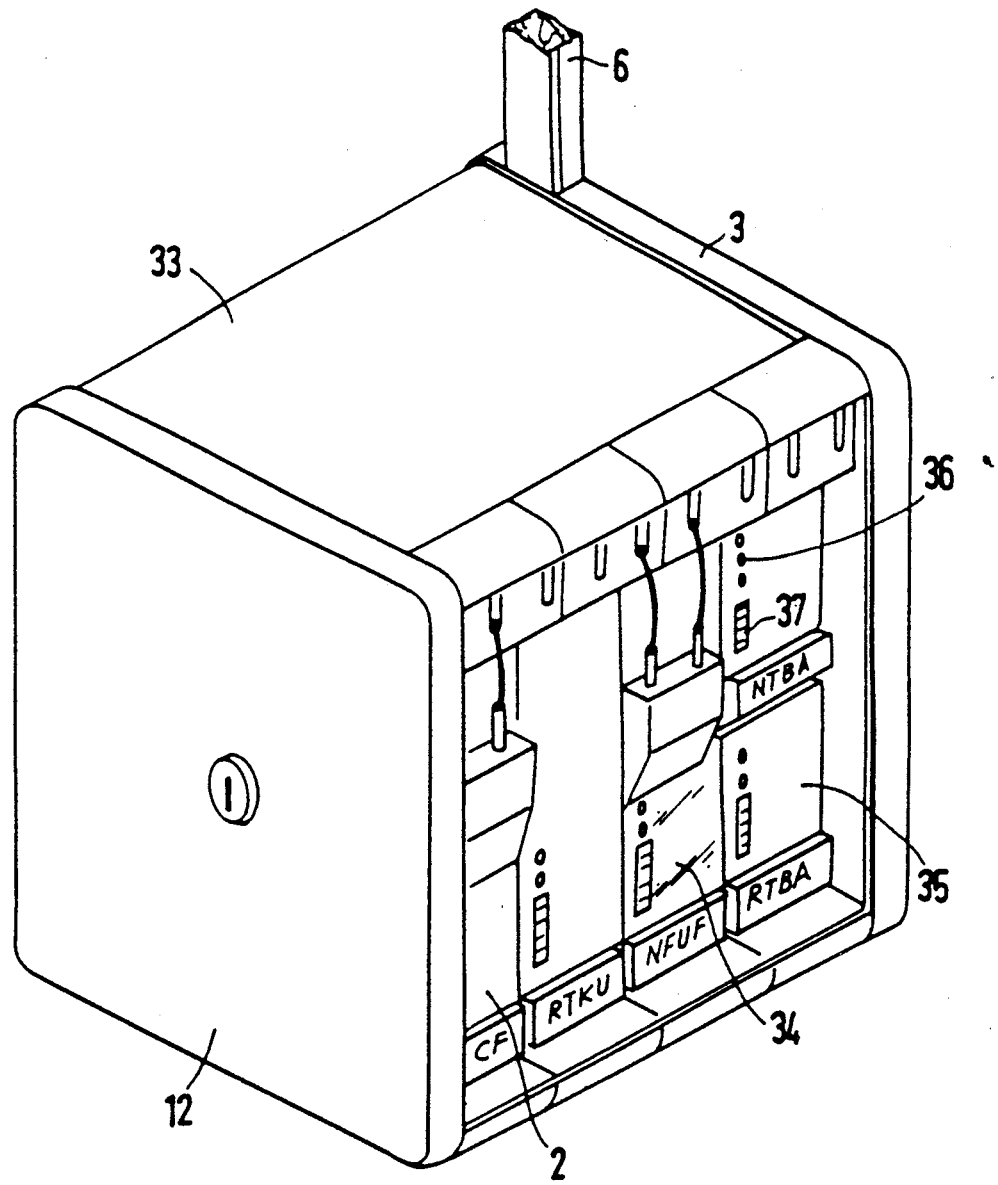
FIG. 3 is a perspective front view of another embodiment of the housing in accordance with the invention.

The housing shown in FIG. 3 which is designed for four plug-in units has a base plate 3 and a cover plate 12 which are identical in design to those described above. The same applies to the internal parts (not shown in detail). However, a wider sheet-metal cover 33 and a wider plexiglass plate 34 are required for this housing.

Located on the right in the housing of FIG. 3, a plug-in unit 35 which can contain, for example, control and monitoring circuits is provided on its front panel with light-emitting diodes 36 and additional display elements 37 which indicate the operating condition and, if necessary, faults in the circuit modules contained in the housing.

The rear view (FIG. 4) shows how the fiber-optic cables 7 run from the cable duct 6 through the holes 38 in the upper spacers 18, as already described above. Furthermore, the path of copper cables 39 can be seen via which a supply voltage of, for example, 60 V is fed from a terminal block 40 to a rear solder terminal plate 41, which is present in each plug-in unit 2. Each solder terminal plate 41 contains a multipin connector, which is covered by a cover plate 42.

Figure 4:
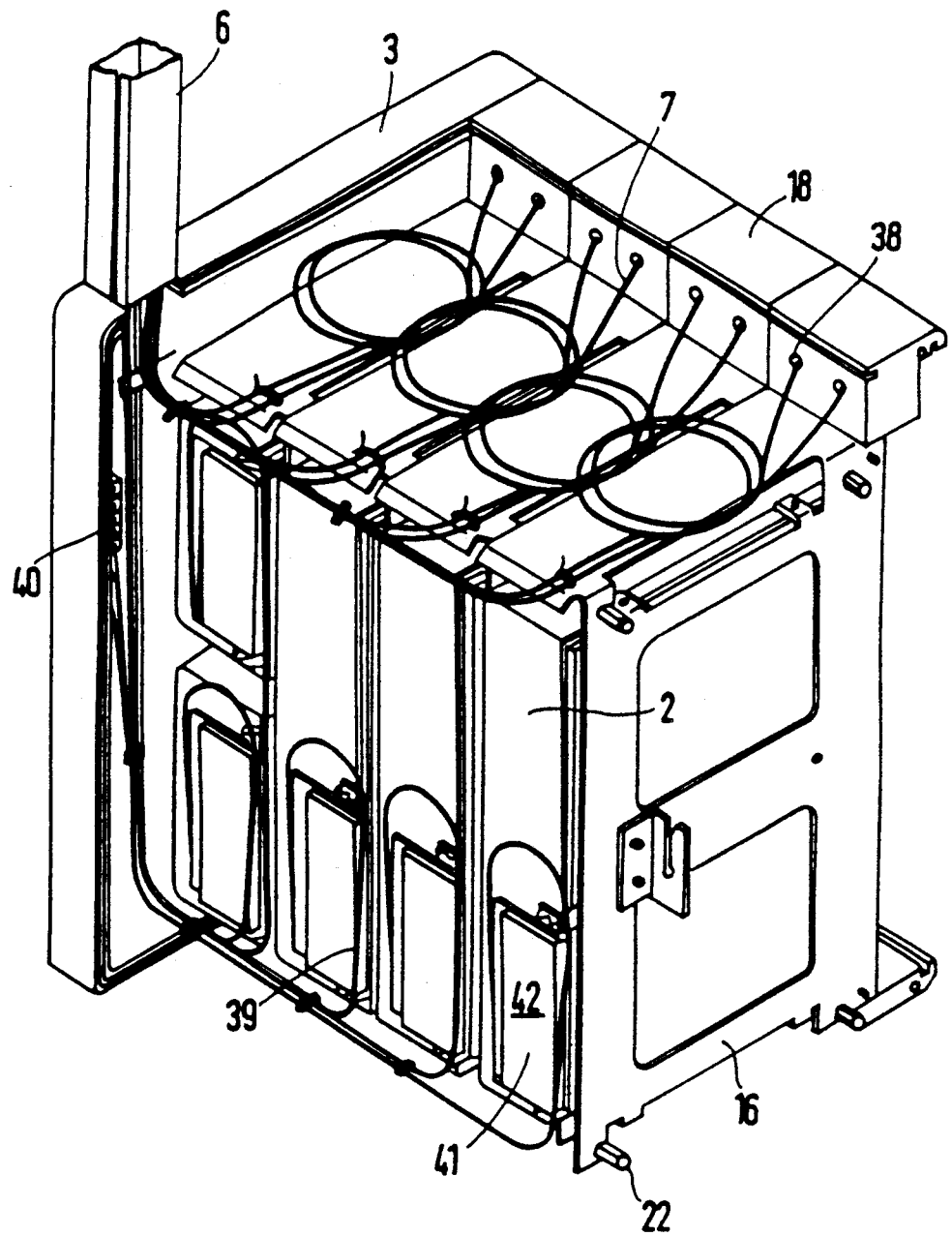
FIG. 4 is a perspective rear view of the housing of FIG. 3, with parts of the housing removed.

It can be clearly seen in FIG. 4 that the plug-in units received in the housing in accordance with the invention including the solder terminal plates and the electric and optical lines are readily accessible from all sides, especially from the rear, too, after only the cover plate 12 and the sheet-metal cover 9 or 33 have been removed, as shown in FIG. 4.

What is claimed is:

1. Extensible modular housing for at least two communication network termination units, said housing comprising
    a vertical base plate which forms a first side of the housing,
    at least two chassis modules into each of which at least one termination unit may be plugged,
    first holding means for connecting a first said chassis module to said base plate,
    auxiliary holding means for connecting a second said chassis module to the first chassis module,
    sidewall means for covering the top, rear, bottom and front of said first and second chassis modules, the lateral extent of said sidewall means being dependent on the width and number of said chassis modules within said housing,
    a cover plate which forms a second side of the housing,
    locking means for locking the cover plate to the second chassis module, and
    retaining means for securely retaining the sidewall means between the cover plate and the base plate when the cover plate is locked to the second chassis module,
    whereby the interior space of the housing may be protected against unauthorized access and
    whereby the thus-protected interior space may be increased by adding one or more additional said chassis modules between said first and second chassis modules and increasing the lateral extent of said sidewall means.

2. A housing as claimed in claim 9, wherein said retaining means comprises grooves provided in the base plate and the cover plate for receiving the sidewall means, and side sidewall means comprises a U-shaped sheet metal cover inserted into said grooves.

3. A housing as claimed in claim 2, wherein said sidewall means further comprises a front sidewall formed by a transparent plastic plate also inserted into said grooves.

4. A housing as claimed in claim 9, wherein each said chassis module comprises a lateral mounting plate supported between respective upper and lower spacers.

5. A housing as claimed in claim 4, wherein the lateral mounting plate of the second chassis module is provided with a locking plate into which a dead bolt of a lock mounted in the cover plate enters.

6. A housing as claimed in claim 5, wherein the auxiliary holding means comprises a plurality of sectional posts which have an external thread at one end and a corresponding internal thread at the other end for securing the chassis modules to one another in a predetermined spaced relationship.

7. A housing as claimed in claim 4, wherein each said upper spacer contains channels for passing fiber-optic cables therethrough.

8. A housing as claimed in claim 1, wherein the base plate is designed for wall mounting, and its edge portion has an opening for receiving the end of a cable duct.

* * * * *